United States Patent [19]

Foulletier et al.

[11] 4,000,175
[45] Dec. 28, 1976

[54] POLYFLUORINATED QUATERNARY AMMONIUM SALTS

[75] Inventors: Louis Foulletier, Oullins; Jean-Pierre Lalu, La Mulatiere, both of France

[73] Assignee: Produits Chimiques Ugine Kuhlmann, Paris, France

[22] Filed: May 20, 1970

[21] Appl. No.: 39,147

[30] Foreign Application Priority Data

May 8, 1969 France .............................. 69.14689

[52] U.S. Cl. .................. 260/459 R; 260/567.6 M; 260/567.6 R; 260/567.6 F
[51] Int. Cl.$^2$ ............... C07C 141/04; C07C 87/30; C07C 91/26
[58] Field of Search ..... 260/459, 567.6 M, 567.6 R

[56] References Cited
UNITED STATES PATENTS

| | | | |
|---|---|---|---|
| 2,569,326 | 9/1951 | Niederl | 260/567.6 M X |
| 2,623,870 | 12/1952 | Sanders | 260/567.6 M X |
| 2,727,923 | 12/1955 | Husted | 260/567.6 M |
| 3,257,407 | 6/1966 | Brace | 260/567.6 M X |
| 3,318,954 | 5/1967 | Curtin | 260/567.6 M |
| 3,398,197 | 8/1968 | Miller et al. | 260/567.6 R X |
| 3,418,355 | 12/1968 | Rüegg | 260/459 |

FOREIGN PATENTS OR APPLICATIONS 1,084,134  9/1967  United Kingdom ........ 260/567.6 M

OTHER PUBLICATIONS

Karrer "Organic Chemistry" Elseiuer N.Y. (1946) p. 901.
*Chemistry of Organic Compounds,* Hudlicky p. 239 (1962).
*Organic Chemistry,* Morrison and Boyd pp. 735 and 748 (1966).
Schwartz et al. "Surface Active Agents and Detergents", vol. II, p. 205, Interscience (1958).

Primary Examiner—Donald G. Daus
Assistant Examiner—D. B. Springer
Attorney, Agent, or Firm—Pennie & Edmonds

[57] ABSTRACT

This invention relates to new products of the general formula:

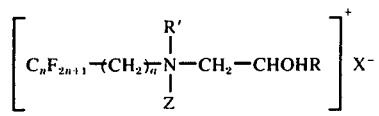

wherein $C_nF_{2n+1}$ represents a straight or branched perfluorinated hydrocarbon chain in which $n$ is a number between 1 and 20; $a$ is an even number having the value 2 or 4; R represents a hydrogen atom or the methyl radical; Z represents an alkyl hydrocarbon radical containing from 1 to 8 carbon atoms, or the radical — $CH_2$ — CHOHR, or a cycloalkyl hydrocarbon radical containing from 5 to 9 carbon atoms or an aryl hydrocarbon radical containing from 6 to 10 carbon atoms; R' represents an alkyl hydrocarbon radical containing from 1 to 9 carbon atoms; and X is an anion which can be a halide, a sulphate, or an alkyl sulphate. These products are useful as surface active agents.

4 Claims, No Drawings

POLYFLUORINATED QUATERNARY AMMONIUM SALTS

SUMMARY OF THE INVENTION

The present invention relates to new products or compounds having the general formula:

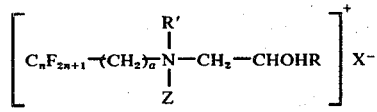

in which $C_nF_{2n+1}$ represents a straight or branched perfluorinated hydrocarbon chain; $n$ is a number between 1 and 20; $a$ is an even number having the value 2 or 4; R represents a hydrogen atom or the methyl radical; Z represents an alkyl hydrocarbon radical containing from 1 to 8 carbon atoms, or the radical $- CH_2 - CHOHR$, or a cycloalkyl hydrocarbon radical containing from 5 to 9 carbon atoms or an aryl hydrocarbon radical containing from 6 to 10 carbon atoms; R' represents an alkyl hydrocarbon radical containing from 1 to 9 carbon atoms; and $X^-$ is an anion which can be a halide, a sulphate or an alkyl sulphate. Among these anions the halides such as the fluoride, the chloride, the bromide and the iodide, and alkyl sulphates such as the $CH_3 - SO_4-$ are particularly advantageous.

The products of this invention can be prepared by reacting a halide and an aminoalcohol, one of which is polyfluorinated at a temperature between 0° and 180° C., in the presence or absence of a solvent which is inert towards the reactants.

DETAILED DESCRIPTION OF THE INVENTION

One manner by which the products of this invention can be prepared involves the reaction of a polyfluoroaminoalcohol having the formula $C_nF_{2n+1}$-(-$CH_2$-)$_a$ $NZ - CH_2 - CHOHR$ and a compound of the formula R'X, wherein X and R' have the hereabove assigned meaning, according to the equation (1):

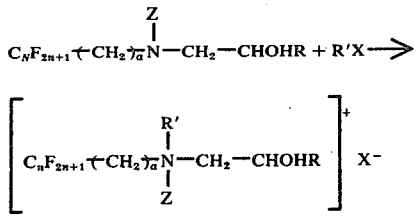

The polyfluoroaminoalcohols having the formula $C_nF_{2n+1}$ -(-$CH_2$-)$_a$ $NZ - CH_2 - CHOHR$, in which $n$, $a$, Z and R have the above assigned meanings, have been described by the applicants in the Belgian Pat. No. 708,723 (U.S. Ser. No. 694,105, filed Dec. 28, 1967, now abandoned), U.S. application Ser. No. 851,095, filed Aug. 18, 1969, now abandoned, U.S. application Ser. No. 885,257, filed Dec. 15, 1969, which has issued on Sept. 11, 1973 as U.S. Pat. No. 3,758,587, and U.S. application Ser. No. 8,064, filed Feb. 2, 1970, now abandoned, all of which are assigned to the same assignee of this application.

The products of this invention can also be prepared under the same general conditions by reacting a polyfluoroalkane halide having the formula $C_nF_{2n+1}$ -(-$CH_2$-)$_a$ X, and an aminoalcohol having the formula $Z - NR' - CH_2 - CHOHR$, according to the equation (2):

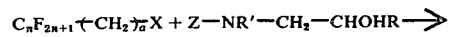

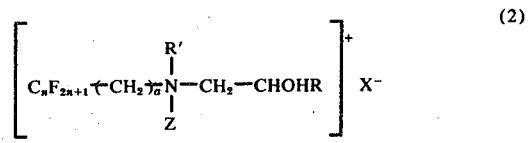

in which $n$, $a$, X, Z, R' and R have the above assigned designations.

However, when $a$ is equal to 2, this reaction (2) can be accompanied with the formation of an important quantity of olefin according to the parasite reaction (3)

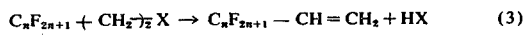

When the starting compound is of the type $C_nF_{2n+1}$ -(-$CH_2$-)$_2$ X, it is possible, instead of employing the reaction (2), to cause the reaction of this compound with an aminoalcohol of the type

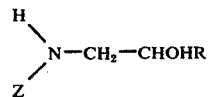

according to the reaction (4):

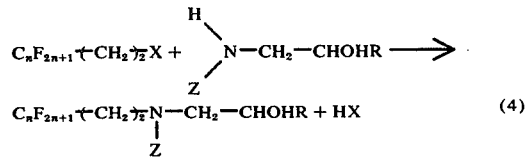

and cause to react this polyfluoroaminoalcohol according to the reaction (1), $n$, X, Z and R having the above assigned meanings.

The preparation of the halides of polyfluoroalkanes $C_nF_{2n+1} + CH_2 -)_a X$ is well known (refer, for instance, to the Journal of the Chemical Society, 1949, 2856).

The reactions represented by the equations (1) and (2) can be carried out without a solvent or with a solvent which is inert towards the reactants and not otherwise interfere with the reaction. Examples of solvents that can be used include ethers, such as the ethyl ether and dioxan; aliphatic or aromatic hydrocarbons, such as the hexane, and toluene; esters such as the ethyl acetate; alcohols, such as the ethanol and normal pentanol. These reactions can also be carried out in mixtures of various solvents, such as mixtures of ethyl acetate and ethanol.

The temperature of the reactions (1) and (2) can be carried out at between about 0° and 180° C., and advantageously between about 30° and 120° C. According to the adopted conditions of the reaction it is also possible to carry out the reaction in an autoclave under an autogenous pressure which can be determined by those skilled in the art.

The new fluorinated products of this invention have very interesting and varied uses. They can be used in the form of an aqueous solution, in the form of an organic solution or in suspension as surface active agents. More particularly, the compounds are useful as levelling agents in waxes, varnishes and paints, as emulsifiers for the separation of the components of ores by the flotation process, and as emulsifiers of hydrocarbons in an aqueous solution. The compounds, when adsorbed on various materials, such as textiles, impart thereto valuable oleophobic and hydrophobic properties.

The few values given in the two tables set forth below illustrate the remarkable surface active properties of the new products forming the subject of the invention.

EXAMPLE 1

A mixture of 30.1 gms. (0.05 mole) of $C_8F_{17}$ ―(CH$_2$ ― CH$_2$)$_2$ I, of 4.45 gms. (0.05 mole) of (CH$_3$)$_2$ N ― CH$_2$ ― CH$_2$OH and of 50 cm3 of normal amyl alcohol were heated in a suitable reaction vessel at 90° C. for 4 hours under constant stirring. After cooling down the reaction mixture to 20° C. and filtering, 35 gms. of the solid obtained was washed 4 times with 50 cm3 of ethyl ether, then recrystallized in 150 cm3 of mixture of ethyl acetate (90 percent) and ethanol. 30.8 gms of

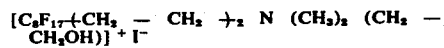

TABLE 1

| | LOWERING OF THE SURFACE TENSION OF WATER | |
|---|---|---|
| PRODUCT | Concentration of the fluorinated product in the water (ppm) | Surface tension of the aqueous solution (dyne/cm) |
| $\left[ C_{10}F_{21}-CH_2-CH_2-\overset{\overset{CH_3}{\mid}}{N}\ (CH_2-CH_2-OH)_2 \right]^+ I^-$ | 100 | 24.70 |
| $\left[ C_8F_{17}-CH_2-CH_2-\overset{\overset{CH_3}{\mid}}{N}\ (CH_2-CH_2-OH)_2 \right]^+ I^-$ | 1000<br>100 | 17.10<br>39.50 |
| $\left[ C_8F_{17}\text{―}(CH_2\text{―}CH_2)_2\text{―}\overset{\overset{CH_3}{\mid}}{\underset{\underset{CH_3}{\mid}}{N}}\ (CH_2\text{―}CH_2\text{―}OH) \right]^+ I^-$ | 1000<br>100 | 16.45<br>34.50 |
| $\left[ C_8F_{17}-CH_2-CH_2-\overset{\overset{CH_3}{\mid}}{\underset{\underset{CH_3}{\mid}}{N}}(\text{―}CH_2\text{―}CH_2\text{―}OH)\text{―} \right]^+ SO_4CH_3$ | 100 | 21.10 |

TABLE 2

| | FOAMING POWER AT THE CONCENTRATION OF 1 G/L | | | |
|---|---|---|---|---|
| | FOAMS AT 35° C. (cm3) after | | | FOAMS at 70° C(cm3) |
| PRODUCT | 2 mn | 15mn | 30mn | after 2 mn |
| $\left[ C_8F_{17}-CH_2-CH_2-\overset{\overset{CH_3}{\mid}}{N}\ (CH_2-CH_2-OH)_2 \right]^+ I^-$ | 650 | 530 | 420 | 580 |
| $\left[ C_8F_{17}-CH_2-CH_2-\overset{\overset{CH_3}{\mid}}{\underset{\underset{CH_3}{\mid}}{N}}-CH_2-CH_2-OH \right]^+ I^-$ | 900 | 800 | 760 | 870 |
| $\left[ C_8F_{17}\text{―}(CH_2\text{―}CH_2)_2\text{―}\overset{\overset{CH_3}{\mid}}{\underset{\underset{CH_3}{\mid}}{N}}\text{―}CH_2\text{―}CH_2\text{―}OH \right]^+ I^-$ | 850 | 720 | 650 | 1150 |

The following examples illustrate the invention. In all the examples, the yields are on the starting fluorinated material:

were thus obtained with a transformation rate of 89.5 percent.

EXAMPLE 2

28.4 gms. (0.2 mole) of $CH_3$—I were added to 10.98 gms. (0.02 mole) of $C_8F_{17}$ $+CH_2 — CH_2+_2$ N $(CH_3)$ $(CH_2 — CH_2OH)$ and heated at 40° C. for 30 minutes while being subjected to constant stirring. The reaction medium was maintained at this temperature for 4 hours. $CH_3$ I was then eliminated by distillation and 13.2 gms. of a solid collected which was recrystallized in 50 cm3 of a mixture of ethyl acetate (90 percent by volume) and ethanol. 12.1 gms of

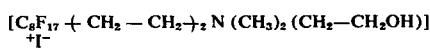

were thus isolated with a transformation rate of 87.5 percent.

EXAMPLE 3

56.8 gms. (0.4 mole) of $CH_3$—I were added to 20.8 gms. (0.04 mole) of $C_8F_{17} — CH_2 — CH_2 — N (CH_3) — CH_2 — CH_2OH$ and heated at 42° C. for 30 minutes while being subjected to constant stirring. The reaction medium was maintained at this temperature for 4 hours. $CH_3$ I was then eliminated by distillation and 24.2 gms. of a solid collected which was recrystallized in 100 cm3 of a mixture of ethyl acetate (95 percent by volume) and ethanol. 21.5 gms. of

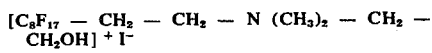

were thus isolated with a transformation rate of 81 percent.

EXAMPLE 4

50.4 gms. (0.4 mole) of $SO_4 (CH_3)_2$ were added to 20.8 gms. (0.04 mole) of $C_8F_{17}—CH_2—CH_2—N(CH_3)—CH_2—CH_2OH$ and heated at 80° C. for 30 minutes while being subjected to constant stirring. During this adding, the temperature rose to 90° C. The reaction mixture was then maintained at 80° C. for 4 hours. The reaction mixture was stirred with ethyl ether (4 times with 100 cm3) and 25.2 gms. of a solid collected by filtration. The solid was dried under vacuum and recrystallized in 65 cm3 of ethanol. 21.3 gms. of

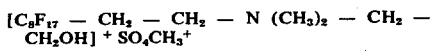

were thus isolated with a transformation rate of 82.5 percent.

EXAMPLE 5

14.2 gms. (0.1 mole) of $CH_3$ I were added to a mixture of 10.06 gms. (0.02 mole) of

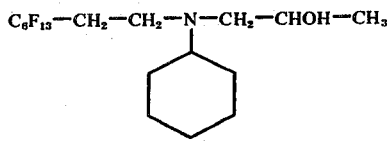

and 50 cm3 of ethyl acetate and the mixture heated at 40° C. for 30 minutes while being subjected to constant stirring. The reaction mixture was maintained at this temperature for 4 hours. Then the reaction was cooled down to 20° C., and filtered, the solid recovered therefrom and dried under vacuum. 11.75 gms. of

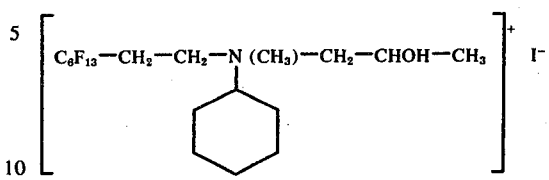

were thus obtained with a transformation rate of 91 percent.

EXAMPLE 6

35.5 gms. (0.25 mole) of $CH_3$ I were added to a mixture of 32.55 gms. (0.05 mole) of $C_{10}F_{21} — CH_2 — CH_2 — N (CH_2 — CH_2OH)_2$, of 120 cm3 of ethyl acetate and 30 cm3 of ethanol heated at 42° C. for 30 minutes while being subjected to constant stirring. The reaction mixture was maintained at 42° C. for 4 hours and then cooled down to 5° C. A solid was then recovered from the reaction mixture by filtration. 34.8 gms. of

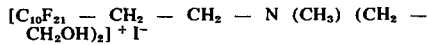

were thus obtained with a transformation rate of 88 percent.

EXAMPLE 7

31.5 gms (0.25 mole) of $SO_4 (CH_3)_2$ were added to a mixture of 32.55 gms. (0.05 mole) of $C_{10}F_{21} — CH_2 — CH_2 — N (CH_2 — CH_2OH)_2$ and 150 cm3 of ethyl acetate heated at 80° C. for 30 minutes while being subjected to a constant stirring. The reaction mixture was maintained at this temperature for 4 hours. The reaction mixture was then cooled down to 5° C. and filtered to obtain a solid which was then dried under vacuum. This solid was composed of 36.6 gms. of

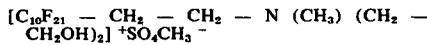

and was obtained with a transformation rate of 93 percent.

EXAMPLE 8

533 gms. (3.75 moles) of $CH_3$ I were poured into a mixture of 413 gms. (0.75 mole) of $C_8F_{17} — C_2H_4 — N (CH_2 — CH_2OH)_2$, 675 cm3 of ethyl acetate and of 75 cm3 of ethanol heated to 42° C. over a period of 1 hour. During this addition, the mixture was subjected to a constant stirring. The reaction mixtures was maintained at this temperature for 4 hours, cooled down to 5° C. and filtered. The resulting filtered solid comprising 501 gms. of

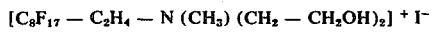

was then dried under vacuum and obtained with a transformation rate of 96 percent.

EXAMPLE 9

A mixture of 30.1 gms. (0.05 mole) of $C_8F_{17}$ $+CH_2 — CH_2+_2$ I, 50 cm3 of normal amyl alcohol and 23.8 gms. (0.2 mole) of $CH_3 — N (CH_2 — CH_2OH)_2$ was heated at 90° C. for 8 hours under constant stirring.

After cooling down the reaction mixture to 20° C. and filtering, the collected solid was washed with ethyl ether (4 times with 50 cm3). The washed solid was dried under vacuum and 30.6 gms. of

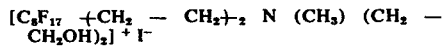

were thus obtained with a transformation rate of 85 percent.

EXAMPLE 10

A mixture of 8.5 gms. (0.015 mole) of

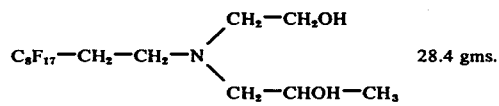   28.4 gms.

(0.2 mole) of $CH_3$ I and of 50 cm3 of carbon tetrachloride was heated to 50° C. for 24 hours under constant stirring. After cooling the reaction mixture to 15° C, the mixture was filtered and a solid has been obtained which was then dried under vacuum.

8.8 gms. of 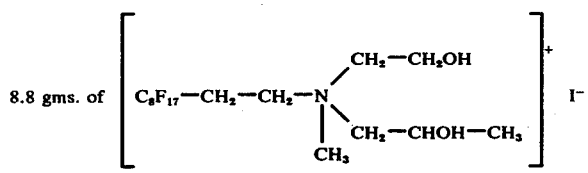

were thus obtained with a transformation rate of 82 percent.

EXAMPLE 11

42.6 gms. (0.3 mole) of $CH_3$ I were added to 14.37 gms. (0.03 mole) of

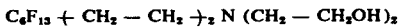

heated to 42° C. over a period of 30 minutes while being subjected to a constant stirring. The reaction mixture was maintained at this temperature for 8 hours. $CH_3$ I was eliminated by distilling and a solid collected which was then dried under vacuum.
17.5 gms. of

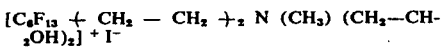

were thus obtained with a transformation rate of 94 percent.

EXAMPLE 12

31.5 gms. (0.25 mole) of $SO_4 (CH_3)_2$ were added to a mixture of 22.55 gms. (0.05 mole) of $C_6F_{13} - CH_2 - CH_2 - N (CH_2 - CH_2OH)_2$ and of 100 cm3 of ethyl acetate heated to 80° C. over a period of 30 minutes while being subjected to constant stirring. The reaction mixture was maintained at this temperature for 24 hours and then cooled down to 0° C. after which it was filtered and the solid thus obtained washed with ethyl ether (4 times with 50 cm3). The isolated solid was then dried under vacuum. 24.8 gms. of

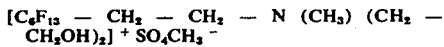

where thus obtained with a transformation rate of 86 percent.

EXAMPLE 13

35.5 gms. (0.25 mole) of $CH_3$ I were added to a mixture of 37.55 gms. (0.05 mole) of $C_{12}F_{25} - CH_2 - CH_2 - N (CH_2 - CH_2OH)_2$, 100 cm3 of ethyl acetate and 100 cm3 of ethanol heated at 40° C. over a period of 30 minutes while being subjected to a constant stirring. The reaction mixture was maintained at this temperature for 8 hours then cooled down to 0° C., and filtered to obtain a solid which was then dried under vacuum. 37.9 gms. of

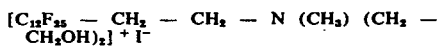

were thus obtained with a transformation rate of 85 percent.

We claim:
1. Products of the formula:

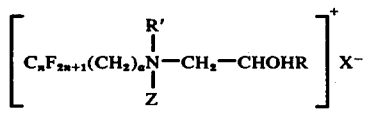

wherein $C_nF_{2n+1}$ represents a straight or branched perfluorinated hydrocarbon chain in which n is a number between 1 to 20; a is an even number having the value 2 or 4; R represents a hydrogen atom or the methyl radical; Z represents an alkyl radical having from 1 to 8 carbon atoms, or the radical $- CH_2 - CHOHR$, R' represents an alkyl radical having from 1 to 9 carbon atoms; and $X^-$ is an anion selected from a halide, sulphate, or an alkyl sulphate.

2. A compound of the formula

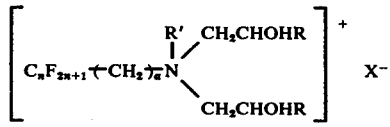

wherein $C_nF_{2n+1}$ represents a straight or branched perfluorinated hydrocarbon chain in which n is a number between 1 and 20; a is 2 or 4, R' is an alkyl hydrocarbon radical containing from 1 to 9 carbon atoms; R is hydrogen or the methyl radical and $X^-$ is an anion selected from a halide, a sulfate or an alkyl sulfate.

3. A compound according to claim 2 of the formula

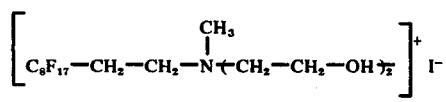
4. A compound according to claim 2 of the formula
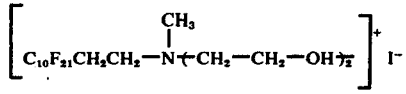
* * * * *

UNITED STATES PATENT AND TRADEMARK OFFICE
CERTIFICATE OF CORRECTION

PATENT NO. : 4,000,175
DATED : December 28, 1976
INVENTOR(S) : Louis Foulletier and Jean-Pierre Lalu It is certified that error appears in the above-identified patent and that said Letters Patent are hereby corrected as shown below:

Column 5, Line 48, the last portion of the formula reads "$+SO_4CH_3+$", should read $+SO_4CH_3-$ Signed and Sealed this Twenty-sixth Day of April 1977

[SEAL]

Attest:

RUTH C. MASON
*Attesting Officer*

C. MARSHALL DANN
*Commissioner of Patents and Trademarks*